United States Patent [19]

De Aberasturi

[11] 4,427,076
[45] Jan. 24, 1984

[54] TUBULAR SPIKE CARRYING SHAFT

[75] Inventor: Doreoteo J. De Aberasturi, Vitoria, Spain

[73] Assignee: Agrator, S.A., Vitoria, Spain

[21] Appl. No.: 294,921

[22] Filed: Aug. 21, 1981

[51] Int. Cl.$^3$ .................. A01B 33/02; A01B 33/12; A01B 33/14
[52] U.S. Cl. .................................. 172/548; 172/119
[58] Field of Search .............. 172/119, 122, 123, 540, 172/548, 549, 554, 719

[56] References Cited

U.S. PATENT DOCUMENTS

| | | | |
|---|---|---|---|
| 392,697 | 11/1888 | Smith et al. | 172/554 |
| 1,296,153 | 3/1919 | Anderson | 172/122 |
| 1,476,917 | 12/1923 | Patitz | 172/119 X |
| 2,669,919 | 2/1954 | Freeman | 172/548 X |
| 3,086,597 | 4/1963 | McClenny et al. | 172/119 |
| 3,362,482 | 1/1968 | Riddle | 172/119 |
| 3,920,079 | 11/1975 | Lely | 172/719 X |
| 4,026,364 | 5/1977 | Lely | 172/119 X |
| 4,098,013 | 7/1978 | Hemphill | 172/719 X |
| 4,174,002 | 11/1979 | Lely | 172/719 X |
| 4,192,387 | 3/1980 | Stinson | 172/119 X |
| 4,216,832 | 8/1980 | Stephenson et al. | 172/540 |
| 4,258,635 | 3/1981 | Lutz et al. | 172/123 X |

FOREIGN PATENT DOCUMENTS

| | | | |
|---|---|---|---|
| 2145899 | 3/1972 | Fed. Rep. of Germany | 172/123 |
| 2721041 | 11/1978 | Fed. Rep. of Germany | 172/123 |
| 1464715 | 2/1977 | United Kingdom | 172/540 |

*Primary Examiner*—Paul E. Shapiro
*Attorney, Agent, or Firm*—Eyre, Mann, Lucas & Just

[57] ABSTRACT

A tubular shaft for rotary cultivators, to which shaft (2) there is attached to a series of tools (4), the tip of each tool comprising a working face (unreferenced) at an angle $\alpha$ to the ground (9) where $\alpha \geq 15°$ and an approach face (7) at an angle $\beta$ to the working face where $35° \leq \beta \leq 75°$ and also where $\alpha + \beta \leq 90°$. The tools (4) are attached throughout the whole length thereof, suitably spaced away from one another, there being at least one such tool per diameter, and all arranged in an orderly fasion so as to cover the whole length of the shaft with no limit, the tools being set at angles to one another so that their tips describe one or several helical paths from one end of the shaft to the other. In this way the effect is achieved whereby the tools enter into contact with the ground in continuous succession, with stresses being shared among them, while the tips all do the same amount of work, where moreover said work takes place under optimum tilling conditions.

7 Claims, 3 Drawing Figures

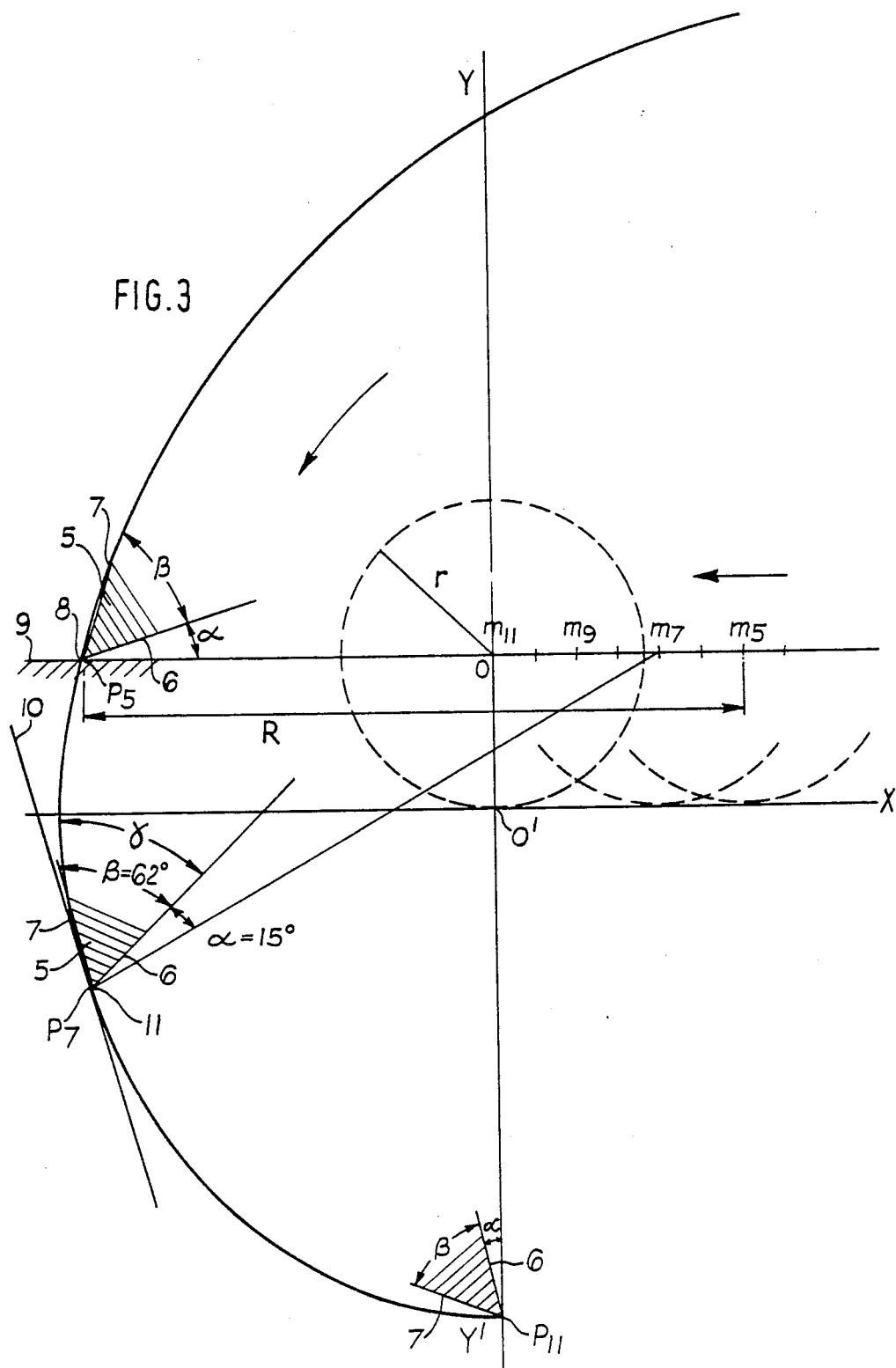

TUBULAR SPIKE CARRYING SHAFT

Machines are used in agriculture for breaking up and turning over the soil so as to put it into optimum condition for subsequent sowing and cultivation of different vegetable species.

Machines are known which are tractor driven and possess a series of tools carried upon a rotating shaft, these being used for the purpose as described on agricultural land.

This kind of machine consumes a lot of energy, due, among other things, to the fact that upon rotating, the tools come into contact with the ground in unfavourable conditions, with no or only a small positive angle of incidence, or even a negative angle of incidence. This results in a dragging or flattening effect taking place, instead of the desired breaking up and turning over of the soil. The angle of incidence $\alpha$ is the angle defined between a tangent to the working face of the tool and a line from the centre of the shaft to the tip of the tool. This angle is positive if it is on the rearward side of said line in the intended direction of rotation of the shaft. The working face and an approach face of the tool are the faces which intersect to form the tip of the tool, the working face being the leading of the two faces in the intended direction of rotation of the shaft.

There are others of these machines which, when in motion, hack the soil into slices, but fail either to break up these slices, or turn them over.

An object of the invention is to provide a tubular spike carrying shaft, applicable to rotary cultivators, which overcomes or at least minimises the disadvantages referred to of known devices.

According to the invention there is provided a tubular spike carrying shaft, applicable to rotary cultivators, to which shaft there is attached a series of spiked tools, wherein a tip of each spiked tool comprises a working face and an approach face which intersect at a cutting edge, and wherein for each tool, a line joining the shaft axis to the cutting edge of the tool forms a positive angle $\alpha$ with a tangent to the working face of the tool at said cutting edge, where $\alpha \geqq 15°$, and where an angle $\beta$ is formed between the working face and the approach face where $$35° \leqq \beta \leqq 75°$$

$$\alpha + \beta \leqq 90°.$$

To the shaft of the invention there is attached a series of tools throughout the whole length thereof, suitably spaced away from one another, there being at least one such tool per section, and all arranged in an orderly fashion so as to cover the whole length of the shaft with no limit, the tools being set at angles to one another so that their tips describe one or several helical paths from one end of the shaft to the other. In this way the effect is achieved whereby the tools enter into contact with the ground in continuous succession, with stresses being shared among them, while the tips all do the same amount of work, where moreover said work takes place under optimum tilling conditions.

Bearing in mind the natural wear which this kind of spike undergoes, allowance is made for them to be wholly or partially replaceable, i.e. the whole tool or only the tips can be replaced.

The longitudinal spacing Z (FIG. 1) between spiked tools in parallel planes in any two consecutive holding collars on the shaft is preferably between zero and three times the greatest width H of one spiked tool.

Since the shaft in a rotary cultivator has a rotating motion of its own, but is in addition drawn along by, for example, a tractor, the tip of each one of the tools describes a trochoid which is a function of the shaft rotation speed, the speed of the motion of the tractor, and the distance R between the tip of the tool and the axis of the rotor shaft.

It has been found experimentally that the tractor and rotary-cultivator assembly will operate in optimum conditions when the rotation of the tools above their shaft takes place in the same direction as that in which the tractor is travelling.

The cutting angle $\beta$, or the angle of the tip of the tool, needs to be sufficiently generous so as to ensure a long life thereof, and to prevent it from breaking easily. Nonetheless, since the tip of the tool is at the same time required to describe the above-mentioned trochoid, said cutting angle must also be such that at no time during the travel of the tool, is there any flattening effect upon the soil, and such that at the most, said cutting angle or angle of the tip shall desirably be equal to the minimum value of the angle formed between the tangent to the tool working face, and the tangent to the trochoid described by the tip of the tool. Under these conditions there is the additional advantage of a self-sharpening effect on the tips.

It has been discovered that the minimum cutting angle that can be used while allowing for a normal tool life is 35°, and in order to comply with the above mentioned requirement whereby there is no flattening effect upon the soil, the cutting angle must be no greater than 75°.

Moreover, in the course of experiments performed with this machine, it has been found that in order for the tool to work in optimum conditions, it is necessary for the angle of incidence $\alpha$ which the approach face of the tool itself forms at the point of contact with the ground to be no less than 15°, because with smaller angles the tool digs into the ground with difficulty and has an increased flattening effect, so that the desired results are not accomplished, while moreover a larger amount of power is absorbed from the engine.

In order for the desired effect to be fully accomplished, and to prevent the result being simply that the ground is sliced up, the tools must travel evenly, with no appreciable sudden changes in the direction they travel.

A further requirement is that $\alpha + \beta \leqq 90°$.

With the shaft of the present invention, the ground can be tilled in optimum conditions with a minimum consumption of energy, while furthermore the tools or means employed for tilling will last longer.

Moreover, the invention overcomes the problem whereby the machine needs to be adapted for working on land where the soil is of a different quality, or where there are variations in its hardness or dampness.

It is with the working conditions accomplished as described, that together the effect is achieved whereby the soil is broken up, aired and turned over towards the rear, and it is perfectly possible for the axis of the shaft even to be below the level of the surface with no difficulty, with the result that a maximum depth of cut is achieved.

The invention will now be described, by way of example, with reference to the accompanying drawings, in which:

FIG. 3 is a schematic view of the incidence of the tool upon the ground, and of the trochoid described by the tip thereof.

Figure 1:
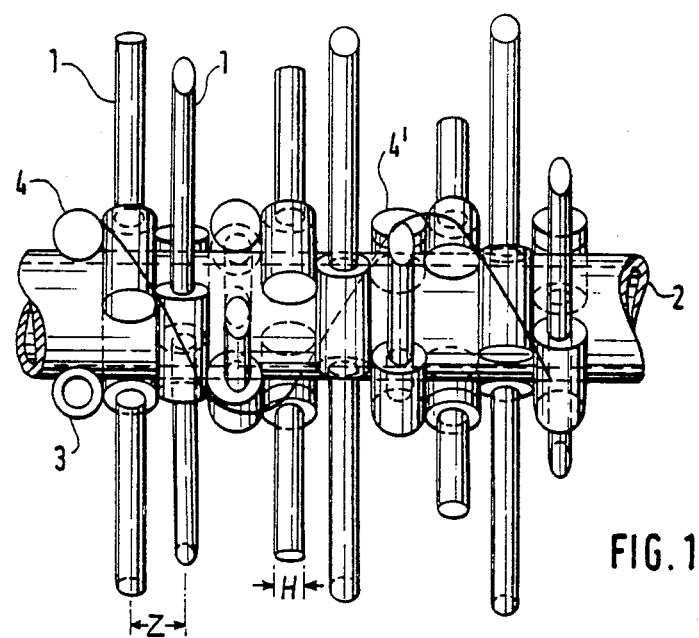
FIG. 1 shows a length of a spike carrying shaft of the present invention.

From FIG. 1 it may be seen that spikes 1 have been adopted as the tilling tools, these being attached to a shaft of the rotor, which in this case is tubular, by means of tangential collars 3. Each collar is set at an angle of approximately 60° with respect to that proceding it or following it, so that with six spikes, a complete circle of 360° is practically covered, but in such a way that like spikes 4, 4′ are slightly out of step with each other. In the example illustrated, they are 5° out of step.

As shown in FIG. 1, the tools lie in parallel radial planes through the shaft 2, i.e. in planes perpendicular to the shaft axis. However the tools need not be arranged perpendicular to said axis and moreover the tools need not all be at the same angle to said axis.

Figure 2:
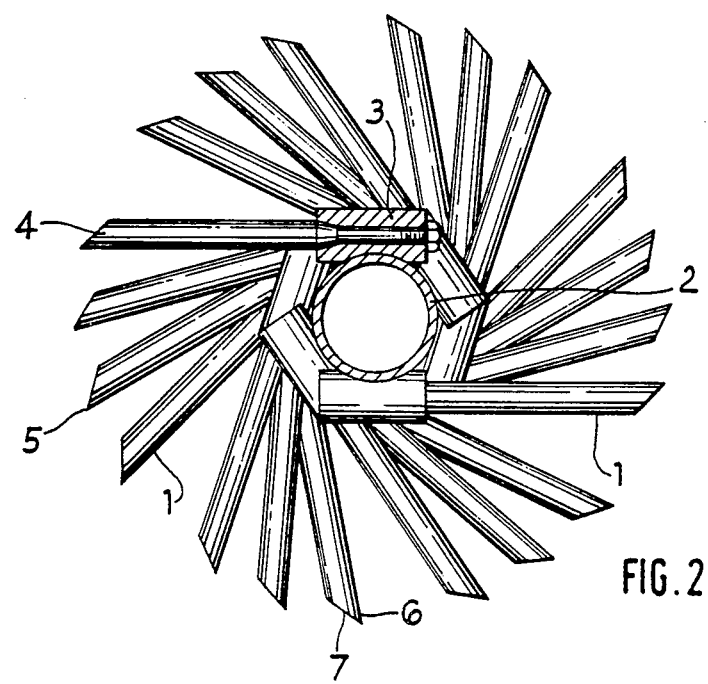
FIG. 2 is a sectional view taken at right-angles to the shaft axis shown in FIG. 1.

The tools or spikes 4 are provided (FIG. 2) with a short conical shaped length which joins an end part having a reduced section which is inserted into a collar 3 and is attached thereto by locking with a nut. It will readily be understood that any conventional method or otherwise of attachment which allows for ease of replacement in the event of wear, is equally appropriate for this application.

FIG. 3 schematically shows how a tool approaches the ground, and how its tip describes a trochoid in its motion.

It is assumed in this particular case that the axis of the rotor shaft is level with the ground at the point O.

The tool tip 5 possesses a working face 6 and an approach face 7 which intersect to form a cutting edge at the tip of the tool.

The working face 6 and the approach face 7 intersect with each other, thus forming a curved or straight edge, although preferably a straight one, and never terminating in a point or the like, because in this case the tip of the tool would be sharp and would stick into any objects which came into its path and would carry them along, and give rise to all the difficulties that this would entail. The tool faces may be flat or curved, as required.

A tangent to the working face 6 forms an angle $\alpha$ with the ground 9 at the point of approach 8 of said working face 6 to the ground, i.e. it forms an angle $\alpha$ with a line from the shaft axis to the point 8 of the tool tip, since the axis of the shaft is at ground level. In the example illustrated, due to the fact that the working face is flat, said tangent is contained therein.

It has been found that in order for the tip of the tool to dig into the ground easily, the following must apply:

$$\alpha \geqq 15°$$

where, in this example, $\alpha = +15°$, i.e. $\alpha$ is a positive angle.

The angle $\beta$ formed between the approach face 7 and the working face 6 is called the sharp or cutting angle.

In the specific case of FIG. 3, the variables are quantified as follows:

The rotor rotation speed Vg is 180 r.p.m.

The tractor forward speed Va is 4 Km/hr., or in other words, Va=66.67 meters/min.

The distance R between the point 8 of the tool tip and the rotor shaft axis is 250 mm.

As explained, the shaft has a rotary motion of its own, and is in addition drawn along the ground by the machine to which it is fitted. Such motion of the cylindrical shaft can be represented by a hypothetical roulette which rolls upon the line which is taken as the X axis, with the Y axis being normal thereto and intersecting the X axis at 0′. The roulette will have a radius r and since $$Va = 2\pi r Vg \text{ then}$$
$$r = (Va/2\pi Vg) = 66.67/(180 \times 2\pi) = 0.05895 \, m$$

The equation of the trochoid in Cartesian co-ordinates as a function of the angle of rotation t of the roulette formed by r and OY′, where t is expressed in radians, and the roulette is rolling to the left as seen in FIG. 3, is as follows:

$$x = rt - R \sin t$$

$$y = r - R \cosine t$$

Substituting the real value in millimeters:

$$x = 58.95t - 250 \sin t$$

$$y = 58.95 - 250 \cosine t$$

Thus the real values for constructing the trochoid can be obtained.

On FIG. 3, the points $P_5$, $P_7$ and $P_{11}$ on the trochoid are the points at which one particular tool tip is disposed as the centre of the roulette is disposed at $M_5$, $M_7$ and $M_{11}$ respectively, these being positions along the ground level. The full roulette is shown in dashed lines with its centre at $M_{11}$ and the tool tip at $P_{11}$, whilst the roulette is only partly shown corresponding to its centre being at $M_5$ and at $M_7$. The arrows on FIG. 3 indicate that the roulette is rotating and moving to the left.

At any point of the trochoid, a tangent can be drawn to the working face 6 of the tool at that point as can a tangent 10 to the trochoid. These two tangents form between them an angle $\gamma$ which in any case must be greater than the cutting angle $\beta$.

By an approximate graphic method, it can be found that the minimum angle formed by the two above mentioned tangents during the travel of the shaft over the land, appears at point 11, with a value of approximately 62°, so that in this case $\beta \leqq 62°$ in order for the shaft carrying the spiked tools to work under optimum conditions.

In any case, the minimum of angle $\beta$ will depend upon the state of wear, the nature of the ground, the possibility of breakage, and so on, it being found that the acceptable working conditions can be achieved when $\beta \geqq 45°$ and always when $\beta \geqq 35°$.

The ideal would be to adapt the theory exactly to practice, and to have a different machine for each case. In view however of the material impossibility of such an application, it has been found in the trials that have therefore been performed, that if $45° \leqq \beta \leqq 75°$, acceptable results are accomplished in any case.

What is claimed is:

1. A tubular spike carrying shaft for rotary cultivators comprising a tubular shaft, a plurality of spiked tools attached at joints on the periphery of said shaft, said joints being angularly offset from one another so as to describe helical lines along the length of the shaft, the longitudinal spacing between consecutive tool tips on the shaft being between zero and three times as large as the greatest width of one of said tools, a tip of each spiked tool comprising a working face and an approach face which intersect at a cutting edge, and wherein for each tool a line joining the shaft axis to the cutting edge of the tool forms a positive angle $\alpha$ with a tangent to the working face of the tool at the cutting edge, where $\alpha \geq 15°$, and an angle $\beta$ is formed between the working face and the approach face wherein $\beta$ is in the range between approximately 35° and 75° and the sum of $\alpha$ and $\beta$ is less than or equal to 90° and wherein the tools are attached perpendicularly to the axis of the shaft.

2. A tubular spike carrying shaft as claimed in claim 1, wherein at least one of the working and approach faces is curved.

3. The structure as claimed in claim 1 wherein each spiked tool is of such size as to cover a space at least equal to its respective section of the shaft.

4. The structure as claimed in claim 1 wherein the tips of the tools are disposed so as to describe a helical path in a substantially continuous manner wherein there are no sudden changes in direction between successive tools.

5. The structure as claimed in claim 4 wherein those tools disposed at approximately the same angle on the shaft are angularly offset from each other by a predetermined angle.

6. The structure as claimed in claim 5 wherein the predetermined offset angle is about 5°.

7. The structure as claimed in claim 1 wherein at the joints for attachment is a collar including a conical shaped bore for a conical shaped section of a tool, an end of the tool being extendable through the collar and being attached thereto by a nut.

* * * * *